MULTIAPERTURE MAGNETIC CORE

Filed Feb. 9, 1965

INVENTORS
DAVID RALPH BENNION
WILLIAM KIRK ENGLISH
BY Samuel Lindenberg
Abraham Wasserman
ATTORNEYS INVENTORS
DAVID RALPH BENNION
WILLIAM KIRK ENGLISH
BY Samuel Lindenberg
Abraham Wasserman
ATTORNEYS INVENTORS
DAVID RALPH BENNION
WILLIAM KIRK ENGLISH
BY Samuel Lindenberg
Abraham Wasserman
ATTORNEYS 3,435,432
Patented Mar. 25, 1969

3,435,432

MULTIAPERTURE MAGNETIC CORE

David Ralph Bennion and William Kirk English, Menlo Park, Calif., assignors to AMP Incorporated, Harrisburg, Pa., a corporation of New Jersey Filed Feb. 9, 1965, Ser. No. 431,337
Int. Cl. G11b 5/74
U.S. Cl. 340—174 18 Claims

ABSTRACT OF THE DISCLOSURE

A multiaperture magnetic core of the type used in logic circuits, such as shift registers, is disclosed. Each core is provided with a flux source branch, disposed between several of the apertures of the core. The flux source branch is inductively coupled to a driving winding so that the branch may be driven from a clear state of magnetic remanence to a set state when information is to be stored in the core. The change in state of magnetic remanence produces a change in magnetic flux distribution within the core, so that a current in a loop interconnecting the receiving core to a preceding core from which information is transferred, need only steer the magnetic flux in the receiving core to casue the distribution thereof to represent the information to be stored therein.

Figure 1:
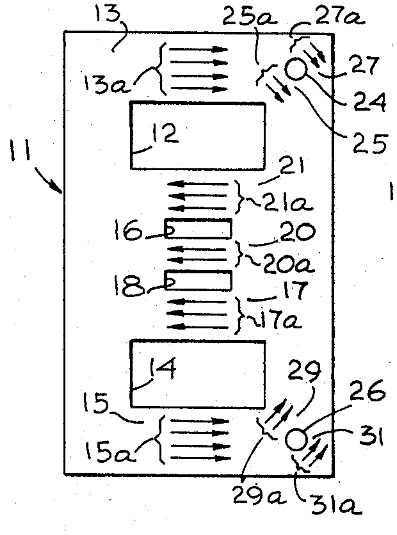

Generally, magnetic core information transferring circuits, such as shift registers include a plurality of stages, with each stage storing a bit of information in a plurality of stages. Each stage generally includes a plurality of magnetic cores. In order to reduce the cost of such a shift register, attempts have been made to interconnect the magnetic cores so that all the functions of each stage of the shift registers are performed by a minimum number of multiaperture magnetic cores.

In the prior art, even when such attempts have been successful, the nature of the transfer scheme dictates that in order for information to be transferred from one core to another, the magnetic flux conditions in each receiving multiaperture core must be changed primarily by current in the input winding which couples the receiving core to the immediately preceding core thereof.

Such transfer schemes require high current in the loop coupling the multiaperture receiving core to the preceding core in the information transferring circuit. The high current results in high transfer losses, which can only be controlled by reducing the resistance of the intercoupling loop. However, lower loop resistance in turn limits the speed at which information may be transferred from one core to the next. Thus, the high currents in the loops coupling the cores of prior art devices is most disadvantageous.

Accordingly, it is an object of the present invention to provide an improved magnetic logic circuit utilizing a transfer scheme together with multiaperture magnetic cores which require a minimum amount of current excitation from a preceding core to secure proper information transfer.

Another object of the present invention is the provision of a multiaperture magnetic core structure which can be intercoupled with other similar cores to comprise a magnetic core shift register in which transfer currents, lower than hitherto possible, can be utilized in the information loops intercoupling the various cores of the shift register for proper information transfer.

A further object of the present invention is to provide a magnetic core shift register in which the resistance in the loops coupling adjacent multiaperture magnetic cores can be considerably greater than in prior art shift registers without increasing the transfer losses therein.

Still a further object of the present invention is the provision of a multiaperture magnetic core structure useful in information transferring circuits which can be made quite small, thereby requiring a minimum amount of driving power.

Yet, another object of the present invention is the provision of a magnetic core shift register, capable of storing and transferring ternary information.

These and other objects of the invention are achieved by providing a multiaperture magnetic core logic circuit, such as a shift register, incorporating a novel transfer scheme. According to the transfer arrangement, the current, needed to control the magnetic flux in a receiving core so that specific information be stored therein, is provided by windings other than the input winding which couples a receiving core to the immediately preceding core from which information is transferred.

Each core is provided with a flux source branch, disposed between several of the apertures of the core. The flux source branch is inductively coupled to a driving winding so that the branch may be driven from a clear state of magnetic remanence to a set state when information is to be stored in the core. The change in state of magnetic remanence produces a change in magnetic flux distribution within the core, so that a current in a loop interconnecting the receiving core to a preceding core from which information is transferred, need only steer the magnetic flux in the receiving core so that the distribution thereof represents the information to be stored therein.

The reduction of the magnitude of current in the intercoupling loops which, according to the teachings disclosed herein, need only be large enough to steer the magnetic flux distribution in a receiving core, results in lower transfer losses. Thus, loops with higher resistance may be utilized for the same amount of losses. The higher loop resistance results in faster operation or speeds, as well as the ability to use smaller cores for the same ize loops. The smaller cores require less driving power, thus resulting in a more compact and efficient circuit.

The shift register of the present invention is driven by a four pulse sequence, referred to as clear odd, prime, clear even, prime, etc. The clear odd pulse sets the flux source branches of all the even cores and the sequences of cores of the register, thus causing flux changes in each of them. Also, the clear odd pulse clears all the odd cores so that a steering current is provided to each even core to steer the flux therein in order to store the information from the preceding odd core which is represented by the steering current induced as the odd core is cleared. The prime pulse shifts the flux distribution around output apertures of the even cores as a function of the information previously stored in them.

During the clear even pulse, the flux source branches of all the odd cores are driven to their set state of magnetic remanence thereby producing a change of magnetic distribution therein. Also, during the clear even pulse, all the even cores are cleared so that each of them induces a current as a function of the information stored therein which is used to steer the flux distribution in a succeeding odd core for the information to be stored therein. The prime pulse, following the clear even pulse, operates in a manner similar to the previously described prime pulse. Namely, it shifts the flux distribution around the output apertures of the odd cores as a function of the information previously stored in them so that a succeeding clear odd pulse may transfer the information stored in each of the odd cores to a succeeding even core thereof.

Figure 2:
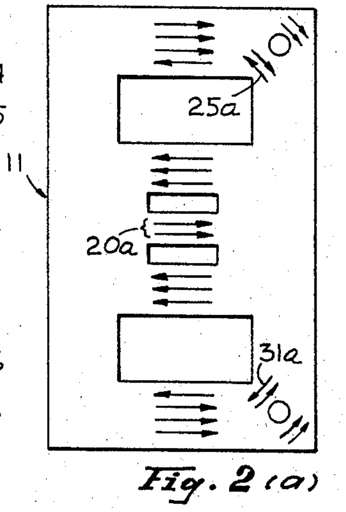
Figure 2:
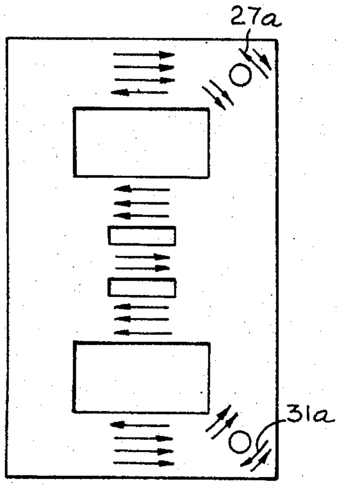
Figure 2:
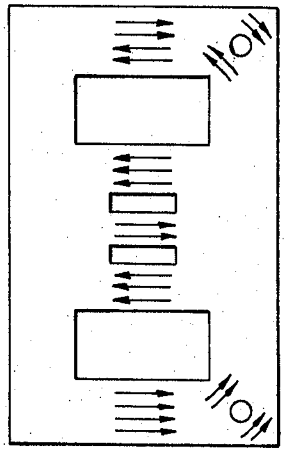
Figure 2:
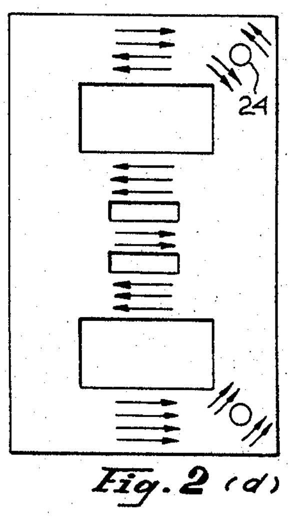
Figure 2:
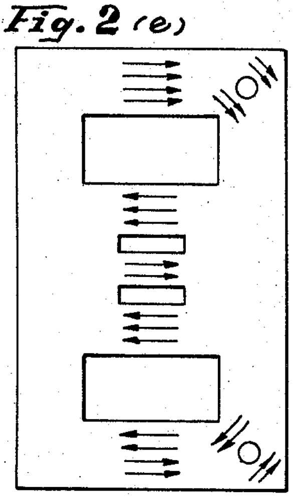
Figure 2:
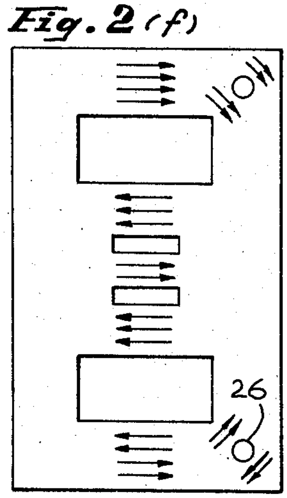
Figure 3:
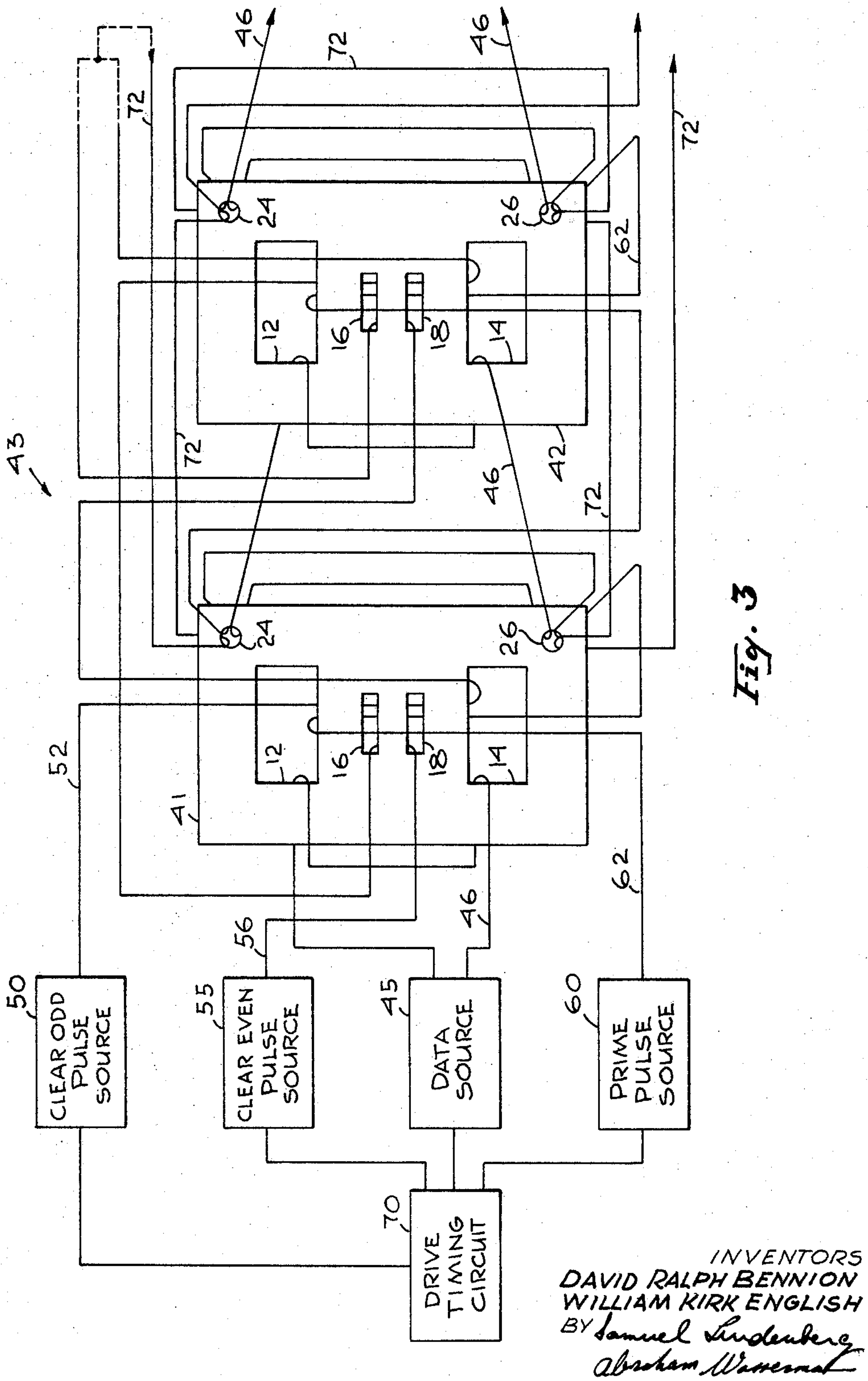
Figure 4:
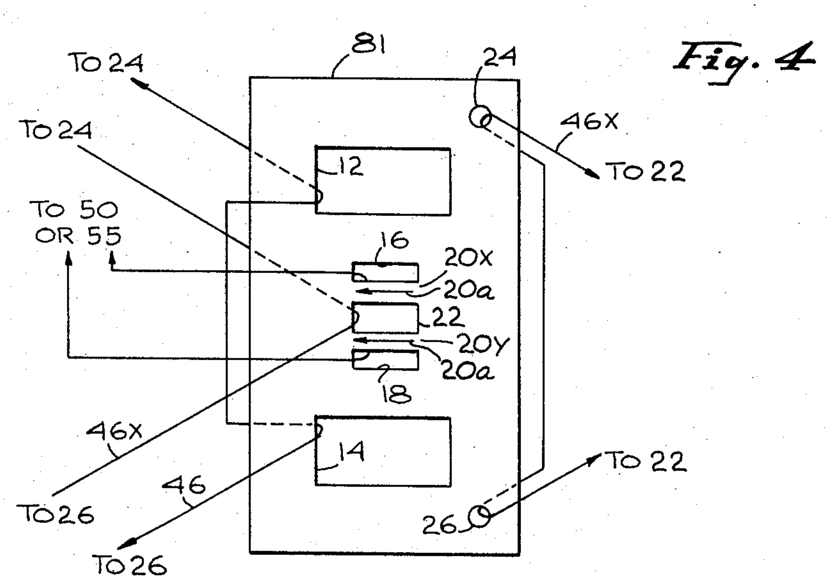
Figure 5A:
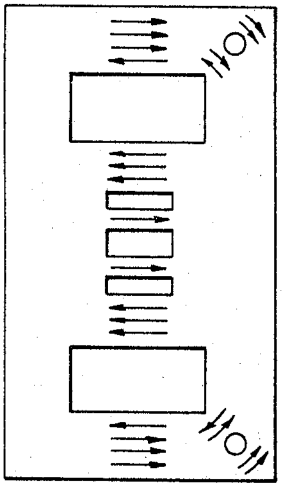
Figure 5B:
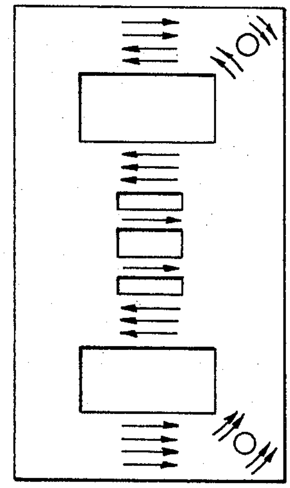
Figure 5C:
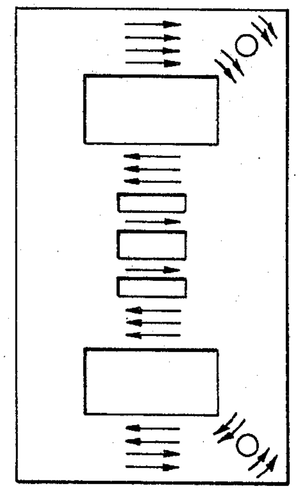

The novel features that are considered characteristic of this invention are set forth with particularlity in the appended claims. The invention itself both as to its organization and method of operation, as well as additional objects and advantages thereof,will best be understood from the following descdiption when read in connection with the accompanying drawings, in which:

FIGURE 1 is a schematic diagram of an embodiment of a magnetic core device constructed in accordance with the present invention illustrating the magnetic flux distribution therein;

FIGURES 2(*a*) through 2(*f*) are schematic diagrams of the magnetic core of FIGURE 1 illustrating the flux distribution therein when storing different elements of information;

FIGURE 3 is a schematic diagram of a magnetic shift register of the present invention;

FIGURE 4 is a schematic diagram of another embodiment of a magnetic core device constructed in accordance with the present invention illustrating alternative coupling arrangements of the core to a preceding core thereof; and FIGURES 5(*a*) through 5(*c*) are schematic diagrams of the magnetic core of FIGURE 4 illustrating the flux distribution therein as a function of storing different elements of information.

Referring to FIGURE 1, there is shown a multiaperture core 11 having, by way of example and not as a limitation, a rectangular shape. The core is of a homogeneous ferromagnetic material having two states of magnetic remanence, so that the lines of magnetic flux in the closed paths surrounding any of the apertures may have either of two polarities.

Apertures 12 and 14 at either end of multiaperture core 11 define peripheral legs 13 and 15, respectively, each having four units of cross-sectional area as indicated by arrows **13*a* and 15*a*. Apertures 16 and 18 divide the core material between apertures 12 and 14 into legs desginated as 17 and 21, each of three units of cross-sectional area as indicated by arrows 17*a* and 21*a* respectively. The material between apertures 16 and 18 comprises a flux source leg 20 having two units of cross-sectional area as indicated by arrow 20*a*. The multiaperture core 11 also comprises a pair of output apertures 24 and 26 which divide the path of flux in legs 13 and 15 around apertures 12 and 14 in half. Namely, the core material between aperture 12 and the periphery of core 11 is divided into two legs 25 and 27 each of two units of cross flux cross-section as indicated by arrows 25*a* and 27*a*. Similarly, output aperture 26 divides the core material into legs 29 and 31, each of two units flux cross-section as indicated by arrows 29*a* and 31*a***, respectively.

For explanatory purposes, let it be assumed that the arrows shown in FIGURE 1, in addition to representing units of cross-section of the various legs, also indicate the direction of flux lines through the various legs. Since the flux lines may be directed in either of two opposite polarities, let it further be assumed that the polarities indicated in FIGURE 1 represent a clear state of each leg, whereas arrows in any of the legs pointing in the opposite direction indicate such leg as being in a set state.

As previously stated, a shift register in accordance with the teachings of the present invention is driven by a four pulse sequence, referred to a clear odd, prime, clear even, prime, etc. During a clear odd pulse, all the odd cores in the register are cleared so that lines of flux therethrough are as shown in FIGURE 1, Also, the flux source leg 20 of each even multiaperture core in the register is set as indicated in FIGURE 2(*a*) by arrows **20*a*** pointing to the right. The setting of any other of the legs of any even core depends on the information transferred from a preceding odd core. Such information may have ternary characteristics, hereinafter referred to as "null," "one," and "zeo."

If during the clear odd drive pulse, in addition to setting the flux source leg of each even core, the current is zero in an information winding, coupling the even core with output apertures 24 and 26 of a preceding odd core, then only leg 20 is set. The reversal of flux in leg 20 causes a symmetrical reversal of flux in portions of legs 13, 15, 25 and 29 as indicated by the reversed arrows **13*a*, 15*a*, 25*a* and 29*a*** in FIGURE 2(*a*). Thus the inner legs 25 and 29 adjacent respective output apertures 24 and 26 switch halfway.

During the following prime pulse, the core is shifted from a set state to a prime state in which the state of flux around the output apertures represents the information stored in the core, so that during a subsequent pulse, such information can be transferred to a succeeding core. As seen from FIGURE 2(*b*), the flux in the output legs 27 and 31 switches halfway as indicated by reversed arrows **27*a* and 31*a*, with dashed lines indicating the closed flux paths. Then during the next clear even pulse, each even core is cleared as well as the flux source leg 20 of each odd core is set. Also, legs 27 and 31 of the even core are cleared thus inducing electromotive forces in an information winding coupling the even core to the succeeding odd core. The windings through apertures 24 and 26** are in opposite polarities so that the induced electromotive forces cancel one another, thus no current flows in the information winding to the next odd core thereby transferring a "null" thereto.

If, however, during the clear odd pulse, a current in the information winding coupling an even core to a preceding odd core flows in a first direction representing a "one," then, as shown in FIGURE 2(*c*), the combined magnetomotive forces due to this current and the switching of flux source leg 20, switches all the flux in leg 25 and half the flux in leg 13. As seen from FIGURE 2(*c*), none of the flux is switched in the legs 15 and 29. During the next prime pulse, the flux around aperture 24 is primed so that leg 27 is set while leg 25 is cleared. The priming of setting of leg 27 is diagrammed in FIGURE 2(*d*) with arrows **27*a* pointing in opposite directions from their clear state. Then, during the succeeding clear even pulse, the even core is cleared, thus clearing leg 27. The difference in the electromotive forces (EMF) induced in the information loop coupling the even core through apertures 24 and 26** will induce a current therein which, when provided to a succeeding odd core, will store a "one" therein.

However, if during the clear odd pulse, the current in the information winding coupling an even core to a preceding odd core is in a second direction, thereby representing a "zero," the behavior of the flux switching in the even core will be similar to that described above, but with the upper and lower outside paths interchanged and with loop-current polarities reversed. Namely, after the clear odd pulse, legs 20, 29 and half of leg 15 will be switched as shown in FIGURE 2(*e*) and after a succeeding prime pulse, legs 20, 31 and half of leg 15 will be switched as shown in FIGURE 2(*f*).

For a more complete understanding of the present invention, reference is made to FIGURE 3 which is a simplified combination block and schematic diagram of the present invention. For simplicity, only two stages 41 and 42 of a shift register 43 are shown, each stage comprising a core, such as multiaperture core 11 (FIGURE 1). A data source 45 is coupled to apertures 12 and 14 of multiaperture core 41 by an information winding 46, whereas apertures 12 and 14 of multiaperture core 42 are coupled to output apertures 24 and 26 of multiaperture core 41 by a similar input winding 46. A clear odd source 50 is coupled, by means of winding 52, through apertures 12 and 14 around the material of multiaperture core 41 defined therebetween as well as through apertures 16 and 18 of multiaperture core 42. Thus, a pulse from source 50 clears multiaperture core 41 as well as sets flux source leg 20 of multiaperture core 42.

Similarly, a clear even pulse source 55 is coupled by means of winding 56 around flux source leg 20 of multiaperture core 41, and the material of multiaperture core 42 between apertures 12 and 14 thereof, so that a clear even pulse sets leg 20 of an odd multiaperture core and clears the even multiaperture core.

Information is storable in multiaperture core 41 during a clear even pulse sequence by providing the core with the information from data source 45 as a function of current in loop 46. The clear even pulse sets leg 20, and the current in loop 46 controls the magnetic flux set in multiaperture core 41. If zero current is supplied, then multiaperture core 41 stores a "null" and is set as diagrammed in FIGURE 2(*a*). On the other hand, a clockwise flowing current from source 45, indicating a "one," combines with the current in winding 56 to set the multiaperture core as indicated in FIGURE 2(*c*). If, however, the current in loop 46 coupling data source 45 to multiaperture core 41 flows in a counterclockwise direction, the multiaperture core is set as diagrammed in FIGURE 2(*e*).

The shift register 43 (FIGURE 3) also includes a prime pulse source 60 which is coupled via winding 62 around the core materials between apertures 12 and 14. The source 60 provides each of the prime pulses which primes the output apertures by transferring the state of magnetic flux from leg 25 and/or leg 29 to leg 27 and/or leg 31. Thus if a "null" is stored [FIGURE 2(*a*)] in a multiaperture core, the prime pulse primes apertures 24 and 26 as shown in FIGURE 2(*b*). If a "one" is stored in a multiaperture core as diagrammed in FIGURE 2(*c*), the following prime pulse primes aperture 24 as shown in FIGURE 2(*d*). On the other hand, a prime pulse following the storing of a "zero," primes output aperture 26 which can be seen from FIGURE 2(*f*).

The sources 45, 50, 55, and 60 are synchonized by a drive control circuit 70 which insures the proper drive sequence of clear odd, prime, clear even, prime, etc. As seen from FIGURE 3, a hold winding 72 is wound through output apertures 24 and 26 of each of multiaperture cores 41 and 42. The purpose of the hold winding 72 is to prevent any spurious effects on the direction of flux lines in the output legs 27 and 31 due to currents in the various windings coupled thereabout. Such holding techniques are well known in the art.

From the foregoing description, it should be appreciated that the shift register 43 (FIGURE 3) is capable of ternary operation, whereby three unique elements of information, such as a "null," a "one," and a "zero" are transferable from the data source 45 to a sequence of multiaperture cores, two of which are shown in FIGURE 3. For binary operation, since the "one" and the "zero" are represented by flux changes (in the multiaperture cores) which are substantially equal in magnitude but of opposite polarity, the shift register impresses a substantially constant load on the pulse sources 50, 55 and 60. Hence, lower impedance sources may be used, resulting in lower power consumption and simpler circuitry. For example, since the register impresses on the pulse sources a constant load, which is independent on information content, constant voltage pulse sources may be employed, thus resulting in higher efficiency and greater simplicity of the driving circuitry.

It should further be appreciated that by setting the flux source leg 20 of each multiaperture core, a sum total of flux, equal to the capacity of the leg 20, is set in one or two of the other legs regardless of the information transferred to such a multiaperture core from a preceding core. Thus, the loops intercoupling the various multiaperture cores through which information is transferred need only supply limited currents to steed the flux within the core so that it is properly distributed therein for storing the particular information. As seen from FIGURES 2(*a*), 2(*c*) and 2(*e*), the flux source leg 20 is set whether a "null," "one" or "zero" respectively are stored in the multiaperture core. Thus, the current in an information loop 46 (FIGURE 3) need only supply sufficient current to steer the flux within the core, so that with no current in loop 46, legs 13 and 15 are partially set [FIGURE 2(*a*)]. Similarly, a steering current in one direction representing a "one" causes half of leg 13 to set [FIGURE 2(*c*)], whereas a steering current in an opposite direction representing a "zero," sets half of leg 15 [FIGURE 2(*e*)].

It is thus seen that the current in each of the information loops need be sufficient only to steer flux in a succeeding multiaperture core, rather than to produce the major flux changes, for proper information storage. The advantages realized by reducing the magnitude of the required current becomes apparent to those familiar with the art. Lower current values result in lower transfer losses, thus permitting the use of longer information loops with higher resistance values, without increase in transfer losses. Also, since the priming operation is related to the resistance of the information loops, the ability to use loops with higher resistance greatly reduces the time required for the priming operation. Thus, the shift register of the present invention can be operated faster than herebefore possible.

It will be further appreciated by those familiar with the art that the ability to use information loops with high resistance values, in addition to increasing the speed of operation, also permits the use of longer information loops for a given multiaperture core size. Consequently, for a given loop length, smaller multiaperture cores can be used. Thus, the register can be made smaller than herebefore possible, and the smaller multiaperture cores can be driven more efficiently with drivers of reduced power.

Reference is again made to FIGURES 2(*a*), 2(*c*), 2(*e*) and 3 used herebefore to describe the novel shift register of the present invention. As seen therefrom, flux source leg 20 of multiaperture core 41 is set by a pulse from clear even pulse source 55, whereas leg 20 of multiaperture core 42 is set by a pulse from clear odd pulse source 50. The setting of a flux source leg of a multiaperture core receiving information may be thought of as dynamically biasing the multiaperture core, since the switching of flux in the flux source leg overcomes major-aperture drive-current thresholds regardless of the information to be stored.

In the multiaperture cores of the structure herebefore described, the setting of the centrally located flux source leg 20 produces full dynamic biasing along the information signal-switching path between apertures 16 and 18. Hence, the current in the information loop 46, representing the information to be stored, has no threshold to overcome. Consequently, if a "null" is to be stored in a multiaperture core, any noise current in the information loop, or lack of balance of core properties on the two halves of each core with respect to the leg 20, may result in a "one" or a "zero" being stored instead. But for the transfer of binary information, there is no need to store a "null" state since the information may be transferred by storing either a "zero" or a "one."

Reference is now made to FIGURE 4 in which the structure of a multiaperture core 81 is diagrammed. As seen, the multiaperture core 81 is similar to core 11 of FIGURE 1 with like elements being designated by like numerals. The only difference in the structure of the two cores is that in multiaperture core 81, an aperture 22 is disposed between apertures 16 and 18 so that flux source leg 20 is divided into two equal legs **20*x* and 20*y***, each of unit cross-section.

Apertures 16 and 18 are coupled to either source 50 or 55 (FIGURE 3), depending on whether multiaperture core 81 is an even or odd core within the sequence of cores of the shift register. Multiaperture core 81 may be coupled to apertures 24 and 26 of a preceding core by means of information loop 46 in a manner similar to that shown in FIGURE 3. As seen from FIGURE 4, the multiaperture core 81 may also be coupled to the apertures 24 and 26 of a preceding core by means of an alternate information loop 46*x*, shown wound through the additional aperture 22.

The addition of aperture 22 creates two short vertical legs adjacent thereto so that a current threshold is created which the current in the information loop (46 or 46*x*) must overcome to produce unsymmetrical flux setting. Thus, the possibility that noise current in the loop, or lack of balance of core properties, may cause the accidental storing of a "zero" or a "one" is practically eliminated. As long as the current in the loop is below a selected value, thus indicating a transfer of a "null," symmetrical flux switching will result as diagrammed in FIGURE 5(*a*). Only when the current exceeds such a selected value and flows in one direction or another, does differential switching take place to store a "one" in the form of flux paths as diagrammed in FIGURE 5(*b*), and a "zero" as diagrammed in FIGURE 5(*c*).

From the foregoing, it should be appreciated that by adding aperture 22 to core 81 (FIGURE 4), the flux state of the core may be stabilized in one of three distinct states. Thus, a shift register comprising a sequence of cores similar to core 81 may be constructed so that ternary information may be stored and transferred therethrough, with each core being capable of receiving and transferring one of three elements of information, such as a "null," "zero" and "one." Thus the overall storage capability of the register is greatly increased.

However, such a register may also be operated to transfer binary information in either bipolar or unipolar fashion. When operated in a bipolar fashion, the binary information is represented by a "one" and a "zero," whereas in unipolar operation, the "null" state may be substituted for either the "zero" state or the "one" state. Referring again to FIGURE 4, the use of loop 46*x* to couple multiaperture core 81 to a preceding core, instead of using loop 46, greatly simplifies the winding problems. When using loop 46x, the winding about each of apertures 22, 24 and 26 may be reduced to a single turn, thus resulting in less expensive wiring of the shift register.

There has accordingly been shown and described several embodiments of a novel and useful shift register comprising a plurality of multiaperture cores driven by a four-pulse sequence. Each multiaperture core includes at least one flux source leg which is set by current in windings other than the winding or loop through which information is transferred to the particular core. Thus, information can be transferred from one multiaperture core to another by providing only steering currents of small magnitudes. The lower current magnitudes enable the use of longer loops without increase in transfer losses, which in turn accounts for higher operational speeds and miniaturization capabilities. The shift register of FIGURE 4 is also able to transfer ternary information, such as a "null," "one" and "zero." It is apparent, however, that either register (FIGURE 3 or FIGURE 4) may be operated to transfer binary information therethrough.

What is claimed is:

1. A core of magnetic material having two states of magnetic remanence and being drivable therebetween, said core having first and second major apertures at substantially opposite ends thereof, the core material extending between the periphery of said core and said first major aperture defining a first peripheral branch of four units of cross-sectional area, and the core material extending between the periphery of said core at the opposite end from said first peripheral branch and said second major aperture defining a second peripheral branch of four units of cross-sectional area, said core having two central apertures between said first and second major apertures, a first central branch of three units of cross-sectional area disposed between one of said central apertures and said first major aperture, a second central branch of three units of cross-sectional area disposed between the other of said central apertures and said second major aperture, a flux source leg of two units of cross-sectional area between said first and second central branches, said core further including first and second output apertures disposed in core material between the periphery and said first and second major apertures dividing the material therebetween into substantially equal magnetic paths, the cross-section of said branches and said flux source leg being taken on a straight line substantially through the centers of said first and second major apertures and said two central apertures.

2. A core of magnetic material as recited in claim 1 further including a third central aperture disposed in said flux source branch between said two central apertures dividing said flux source leg of two units of cross-sectional area into two equal flux source paths.

3. A shift register having a plurality of intercoupled stages with information being transferable between stages in response to driving pulses in a four pulse sequence comprising a plurality of multiaperture magnetic cores, each having a pair of major apertures disposed at opposite ends thereof, and at least two central apertures disposed therebetween whereby the core material between said pair of major apertures defines a plurality of central core branches including a flux source branch, each multiaperture magnetic core further including a pair of output apertures each disposed between the periphery of said core and another of said major apertures to substantially divide the core material into equal branches, each branch having a clear and a set state of magnetic remanence and drivable therebetween, said plurality of multiaperture magnetic cores being arranged in a numbered sequence; first means for driving in response to a first driving pulse each odd numbered core in said sequence to its clear state, and the flux source branch of each even numbered core in said sequence to its set state; second means for driving in response to a second driving pulse each even numbered core to its clear state, and the flux source branch of each odd numbered core in said sequence to its set state; and information loop means for inductively coupling the output apertures of each multiaperture magnetic core to the core material between the major apertures of a succeeding multiaperture magnetic core for transferring to said succeeding multiaperture magnetic core as a function of current induced therein the information stored in said multiaperture magnetic core.

4. A shift register wherein information is transferable between a plurality of intercoupled multiaperture magnetic cores in response to driving pulses in a four pulse sequence comprising a plurality of multiaperture magnetic cores, each having a pair of major apertures disposed at opposite ends thereof, and at least two central apertures disposed therebetween whereby the core material between said pair of major apertures defines a plurality of central core branches including a flux source branch, each multiaperture magnetic core further including a pair of output apertures each disposed between the periphery of said core and another of said major apertures so as to substantially divide the core material into equal branches, each branch having a clear and a set state of magnetic remanence and drivable therebetween, said plurality of multiaperture magnetic cores being arranged in a numbered sequence; first means for driving in response to a first driving pulse each odd numbered core in said sequence to its clear state, and the flux source branch of each even numbered core in said sequence to its set state; second means for driving in response to a second driving pulse each even numbered core to its clear state, and the flux source branch of each odd numbered core in said sequence to its set state; third means for inductively coupling the core material of each multiaperture magnetic core disposed between said major apertures thereof to the output apertures of a preceding multiaperture magnetic core for steering the magnetic remanence in said core to store information as a function of current induced in said third means as said preceding multiaperture magnetic core is driven to its clear state; and means for priming each multiaperture magnetic core so as to control the magnetic remanence in the branches about the output apertures thereof as a function of the information stored therein.

5. A shift register as recited in claim 4 wherein binary information is storable in any of said multiaperture magnetic cores as a function of the flux source branch thereof being driven to said set state, and the current in said third means whereby a first element of information is storable when said current is substantially zero, and second and third elements are storable in said multiaperture magnetic core as a function of the direction of flow of current, above a predetermined magnitude, in said third means.

6. A shift register comprising a plurality of multiaperture magnetic cores arranged in a sequence and being successively designated as odd and even cores in said sequence, each of said cores having a clear and a set state of magnetic remanence and being drivable therebetween, each of said cores having a pair of major apertures defining a pair of peripheral branches and a central core branch disposed therebetween and at least a pair of central apertures disposed in said central core branch so as to define a flux source branch therebetween each core further having a pair of output apertures disposed so as to divide into equal parts core material between the periphery of said core and said major apertures adjacent said peripheral branches; a plurality of closed-loop information transfer windings, a different one of which inductively couples a different pair of cores, each information transfer winding being wound through the output aperture of one core and then about at least a portion of the central branch of the immediately following core in said sequence; means for driving the odd cores in said sequence and the flux source branches of said even cores to their respective clear and set states of magnetic remanence, and for driving the even cores and the flux source branches of the odd cores to their respective clear and set states of magnetic remanence, said means for driving including a first clear winding inductively coupled to all odd cores in said sequence by their major apertures, and to the flux source branches of the even cores by their central apertures, and a second clear winding inductively coupled to all the even cores in said sequence by their major apertures and to the flux source branches of the odd cores by their central apertures; and means including a plurality of priming windings each inductively coupled to one of said cores for controlling the state of magnetic remanence about the output apertures of said core as a function of information stored therein so as to induce a current in the information transfer loop coupling said core to the immediately succeeding core when the core is cleared by said means for driving said plurality of cores to their clear state.

7. A shift register as recited in claim 6 wherein information is stored in each of said cores as a function of the flux source branch being driven to said set state of magnetic remanence and the characteristics of current induced in the information transfer loop coupling said core to the output apertures of the immediately preceding core, when the immediately preceding core is driven to its clear state.

8. A shift register as recited in claim 7 wherein first, second and third elements of information are storable in each core as a function of current below a predetermined magnitude, current above said predetermined magnitude flowing in a first direction, and current above said predetermined magnitude flowing in a direction opposite to said first direction respectively, said current being induced in the information transfer loop coupling said core to the output apertures of the immediately preceding core, as said latter mentioned core is driven to its clear state.

9. A shift register comprising a plurality of multiaperture magnetic cores arranged in a sequence and being successively designated as odd and even cores in said sequence, each of said cores having a clear and a set state of magnetic remanence and being drivable therebetween, each of said cores having first and second major apertures at substantially opposite ends thereof, the core material extending between the periphery of said core and said first and second major apertures defining respective first and second peripheral branches, each branch having four units of cross-sectional area, said core further including first and second central apertures disposed in a central portion thereof between said first and second major apertures so as to define a first central branch of three units of cross-sectional area between said first major aperture and said first central aperture and a second central branch of three units of cross-sectional area between said second major aperture and said second central aperture, with the material between said first and second central apertures defining a flux source branch of two units of cross-sectional area, said cross-sections taken on a straight line substantially through the centers of said first and second major apertures and said first and second central apertures, each core further including a pair of output apertures each disposed between the periphery of said core and another of said first and second major apertures adjacent another of said peripheral branches, so as to divide the core material therebetween into two substantially equal branches of two units of cross-sectional area, the magnetic remanence of the material in said set and clear states controlling flux path characteristics about said apertures; a plurality of closed-loop information transfer windings a different one of which inductively couples a different pair of cores, each information transfer winding being wound through the first and second major apertures of one core and through the output aperture of the immediately preceding core; means for driving the odd cores in said sequence to their clear state, and the flux source branches of the even cores in said sequence to their set state for storing in each of said even cores information as a function of steering current induced in the closed-loop information transfer winding coupling the even core to the output apertures of the immediately preceding odd core, said steering current being induced by changes in the flux paths around the output apertures as each odd core is driven to its clear state; means for driving the even cores in said sequence to their clear state, and the flux source branches of the odd cores in said sequence to their set state, for storing in each of said odd cores information as a function of steering current induced in the closed-loop information transfer winding coupling the odd core to the output apertures of the immediately preceding even core, said steering current being induced by changes in flux in paths around the output apertures of the immediately preceding even core as the even core is driven to its clear state; and priming means wound through the first and second major apertures of each of said cores for controlling the flux about the output apertures of each core to be a function of the informatinn stored therein.

10. A shift register as recited in claim 9 wherein the current in the information transfer loop coupling one of said cores to a preceding core is induced as a function of a first element of information transferred from the preceding core, the current being below a predetermined value so as to steer the flux through the flux source branch of said core to be in closed paths about said first and second central apertures, and thereby store said first element of information in said core, and wherein the current induced is above said predetermined value as a function of a second element of information transferred from the preceding core for steering the flux through the flux source branch of said core to be in a closed path around either said first or said second central apertures so as to store said second element of information therein.

11. A shift register as recited in claim 9 wherein the current induced in the information transfer loop coupling one of said cores to a preceding core is a function of a first element of information transferred from the preceding core, the current having a magnitude above a predetermined level and a first direction of flow, so as to steer the flux through the flux source branch of said core to be in a closed path about said first central aperture, and wherein the current induced in the information transfer is a function of a second element of information transferred from the preceding core, the current having a magnitude above said predetermined level and a direction of flow opposite said first direction so as to steer the flux through the flux source branch of said core to be in a closed path about said second central aperture.

12. A shift register as recited in claim 9 wherein each multiaperture magnetic core further includes a third central aperture centrally disposed in the flux source branch of said core so as to divide the flux source branch into two flux source legs each of substantially unit cross-sectional area.

13. A shift register as recited in claim 12 wherein a different one of said closed-loop information transfer windings inductively couples a different pair of cores, the winding being wound through the third central aperture of a core and the output apertures of the immediately preceding core.

14. A shift register as recited in claim 13 wherein the current in the information transfer loop coupling one of said cores to a preceding core is induced as a function of a first element of information stored in the preceding core the current being below a predetermined value so as to steer the flux through the flux source branch of said core to be in closed paths about said first and second central apertures, and thereby store said first element of information in said core, and wherein the current induced is above said predetermined value as a function of a second element of information stored in the preceding core for steering the flux through the flux source branch of said core to be in a closed path around either said first or said second central aperture so as to store said second element of information therein.

15. A shift register as recited in claim 13 wherein first, second and third elements of information are storable in each core as a function of current below a predetermined magnitude, current above said predetermined magnitude flowing in a first direction, and current above said predetermined magnitude flowing in a direction opposite to said first direction respectively, said current being induced in the information transfer loop coupling said core to the output apertures of the immediately preceding core, as a function of the information transferred from the immediately preceding core.

16. A shift register for storing and transferring ternary information comprising a plurality of multiaperture magnetic cores arranged in a sequence and being successively designated as odd and even cores in said sequence, the material of each of said cores having a clear and a set state of magnetic remanence and being drivable therebetween, each core having a plurality of apertures including a pair of output apertures and a central aperture centrally disposed in a flux source branch so as to divide said flux source branch into two flux source legs; a plurality of closed-loop information transfer windings a different one of which inductively couples a different pair of cores, each information transfer winding being wound through the pair of output apertures of one core and about the flux source branch of the immediately succeeding core; means for driving the flux source branch of each of the even cores in said sequence to said set state and each of the odd cores in said sequence to said clear state to induce a current having one of three distinct characteristics in each of the closed-loop information transfer windings coupling an even core with the immediately preceding odd core so as to store in said even core one of three distinct elements of information as a function of the element of information transferred from the preceding odd core; and means for driving the flux source branch of each of the odd cores in said sequence to said set state and each of the even cores in said sequence to said clear state to transfer ternary information from each even core to the immediately succeeding odd core as a function of the current induced in the closed-loop information transfer winding coupling an even core to the immediately succeeding odd core, the properties of the induced current being a function of the ternary information transferred from the even core.

17. In a shift register wherein information is transferred from one multiaperture magnetic core to an immediately succeeding multiaperture magnetic core, the cores being arranged in a sequence the improvement comprising a multiaperture core of magnetic material having a clear state and a set state of magnetic remanence and being drivable therebetween, said core having first and second major apertures at substantially opposite ends thereof, the core material extending between the periphery of said core and said first major aperture defining a first peripheral branch of four units of cross-sectional area, and the core material extending between the periphery of said core at the opposite end from said first peripheral branch and said second major aperture defining a second peripheral branch of four units of cross-sectional area, said core having two central apertures between said first and second major apertures, a first central branch of three units of cross-sectional area disposed between one of said central apertures and said first major aperture, a second central branch of three units of cross-sectional area disposed between the other of said central apertures and said second major aperture, a flux source leg of two units of cross-sectional area between said first and second central branches, said core further including first and second output apertures disposed in core material between the periphery and said first and second major apertures dividing the material therebetween into substantially equal magnetic paths, the cross-section of said branches and said flux source leg being taken on a straight line substantially through the centers of said first and second major apertures and said two central apertures; an input closed-loop information transfer winding inductively coupling the first and second peripheral branches of said multiaperture core to the material disposed between the periphery and output apertures of an immediately preceding multiaperture core; an output closed-loop information transfer winding inductively coupling the material of said multiaperture core disposed between the periphery and output apertures thereof to the first and second peripheral branches of an immediately succeeding multiaperture core; first driving means including means wound about the core material between said first and second major apertures for driving the multiaperture core to its clear state of magnetic remanence; second driving means including means wound about the flux source leg of said multiaperture core for driving said leg to its set state of magnetic remanence; and prime driving means including means wound about the material of said multiaperture core disposed between said first and second major apertures and through said output apertures to transfer the state of magnetic remanence of the core material between the output apertures and the first and second major apertures to the core material between the output apertures and the periphery of said multiaperture core.

18. In a shift register wherein information is transferred from one magnetic core to an immediately succeeding magnetic core, the cores being arranged in a sequence the improvement comprising a core of magnetic material having a clear state and a set state of magnetic remanence and being drivable therebetween, said core having first and second major apertures at substantially opposite ends thereof, the core material extending between the periphery of said core and said first major aperture defining a first peripheral branch of four units of cross-sectional area, and the core material extending between the periphery of said core at the opposite end from said first peripheral branch and said second major aperture defining a second peripheral branch of four units of cross-sectional area said core having first and second central apertures and an input aperture between said first and second major apertures, a first central branch of three units of cross-sectional area disposed between said first central aperture and said first major aperture, a second central branch of three units of cross-sectional area disposed between said second major aperture and said scond central aperture and first and second flux source legs defining a flux source branch disposed between said input aperture and said first and second central apertures respectively, each flux source leg of a unit cross-sectional area, said core further including first and second output apertures substantially centrally disposed in core material between the periphery of said core and said first and second major apertures respectively adjacent said first and second periphery branches to divide the material between each of said first and second major apertures and said periphery into substantially equal magnetic paths, the cross-section of said branches being taken on a straight line substantially through the centers of said first and second major apertures; an input closed-loop information transfer winding inductively wound through the input aperture of said core and the output apertures of an immediately preceding core; an output closed-loop information transfer winding inductively wound through the output apertures of said core and the input apertures of an immediately succeeding core; first driving means including means wound about the core material between said first and second major apertures for driving the multiaperture core to its clear state of magnetic remanence; second driving means including means wound about the flux source legs of said core for driving said legs to their set state of magnetic remanence; and prime driving means including means wound about the material of said multiaperture core disposed between said first and second major apertures and through said output apertures to transfer the state of magnetic remanence of the core material between the output apertures and the first and second major apertures to the core material between the output apertures and the periphery of said multiaperture core.

References Cited

UNITED STATES PATENTS

| | | | |
|---|---|---|---|
| 2,869,112 | 1/1959 | Hunter | 340—174 |
| 3,145,371 | 8/1964 | Gianola | 340—174 |

JAMES W. MOFFIT, *Primary Examiner.*

J. F. BREIMAYER, *Assistant Examiner.*